United States Patent
Maeda

(10) Patent No.: US 6,919,885 B2
(45) Date of Patent: Jul. 19, 2005

(54) REFLECTIVE DISPLAY DEVICE AND ELECTRONIC DEVICE

(75) Inventor: Tsuyoshi Maeda, Suwa (JP)

(73) Assignee: Seiko Epson Corporation, Tokyo (JP)

(*) Notice: Subject to any disclaimer, the term of this patent is extended or adjusted under 35 U.S.C. 154(b) by 294 days.

(21) Appl. No.: 10/223,623

(22) Filed: Aug. 20, 2002

(65) Prior Publication Data

US 2003/0067457 A1 Apr. 10, 2003

(30) Foreign Application Priority Data

Sep. 4, 2001 (JP) ........................................ 2001-267693

(51) Int. Cl.$^7$ ................................................. G09G 5/00
(52) U.S. Cl. ........................................ 345/204; 345/206
(58) Field of Search ................................ 345/204–214; 385/1–17, 41–50

(56) References Cited

U.S. PATENT DOCUMENTS

| | | | | |
|---|---|---|---|---|
| 5,105,289 A | * | 4/1992 | Sonehara et al. | 349/180 |
| 6,167,169 A | * | 12/2000 | Brinkman et al. | 385/4 |
| 2002/0113770 A1 | * | 8/2002 | Jacobson et al. | 345/107 |
| 2002/0180688 A1 | * | 12/2002 | Drzaic et al. | 345/107 |

FOREIGN PATENT DOCUMENTS

| | | |
|---|---|---|
| JP | A-5-150173 | 6/1993 |
| JP | A-5-196881 | 8/1993 |
| JP | A-5-203888 | 8/1993 |
| JP | A-9-281917 | 10/1997 |
| JP | A-2000-275441 | 10/2000 |
| JP | A-2001-91748 | 4/2001 |

* cited by examiner

*Primary Examiner*—Vijay Shankar
(74) *Attorney, Agent, or Firm*—Oliff & Berridge, PLC

(57) ABSTRACT

The invention provides a quick-response reflective display device that has increased display brightness and contrast and that achieves high display quality. In a reflective display device of the present invention, a plurality of stages are disposed on a substrate so that the angles thereof with the substrate are variable, a hologram element (reflective element) to transmit light incident from a specific direction and reflect light having a specific wavelength incident from a specific direction is formed on a surface of each of the stages opposite from the substrate, an optical absorber to absorb light passing through each hologram element is formed on a side of the hologram element opposite from the light incident side, and a plurality of hologram elements are disposed so as to reflect light components having different wavelengths.

11 Claims, 6 Drawing Sheets

FIG. 3
(a)
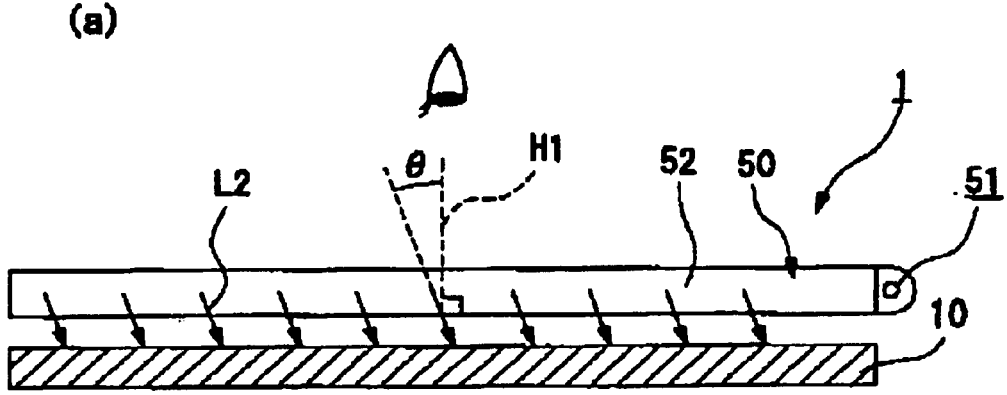
(b)
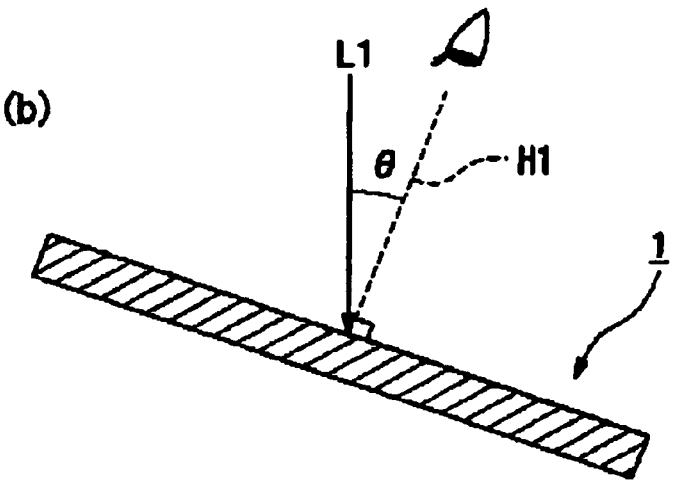

FIG. 4
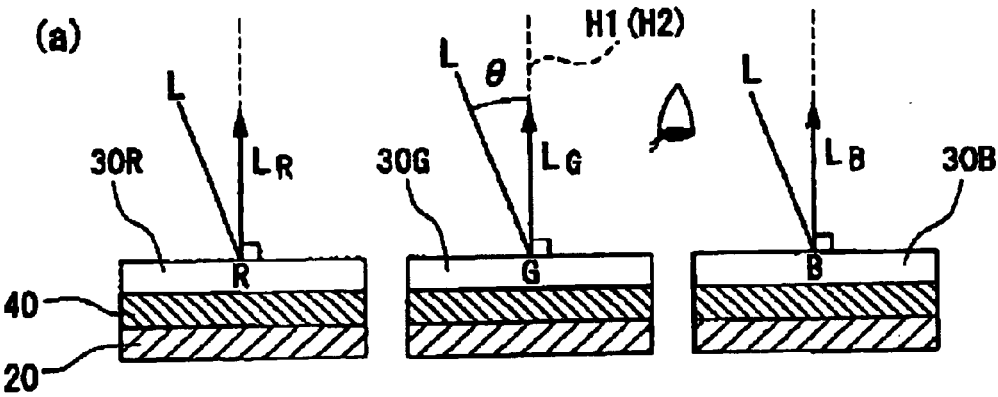
(a)
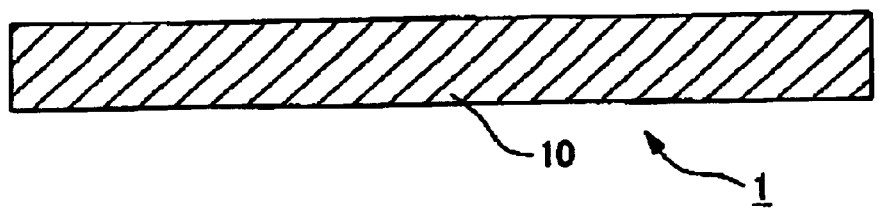
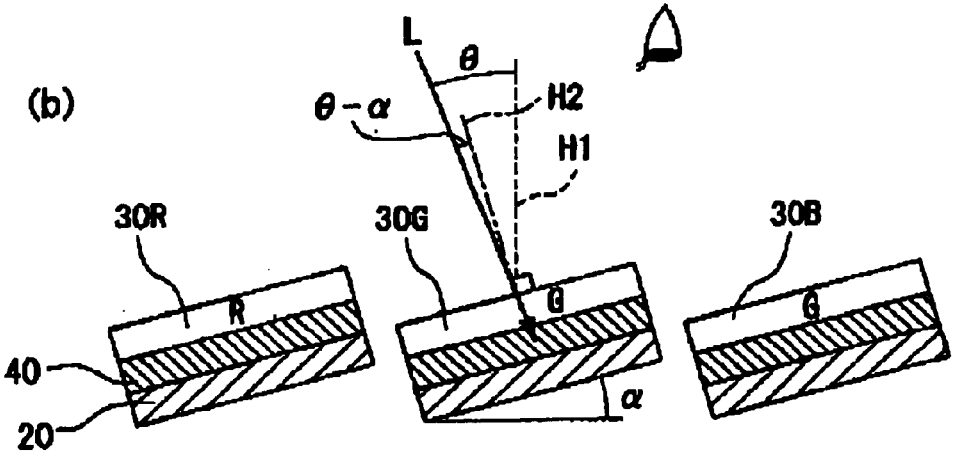
(b)
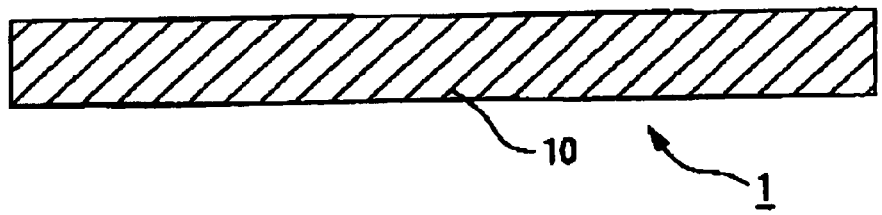

FIG. 6
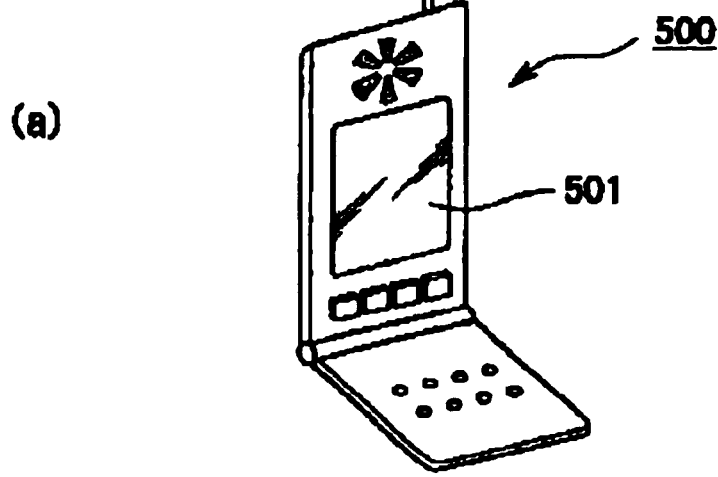
(a)
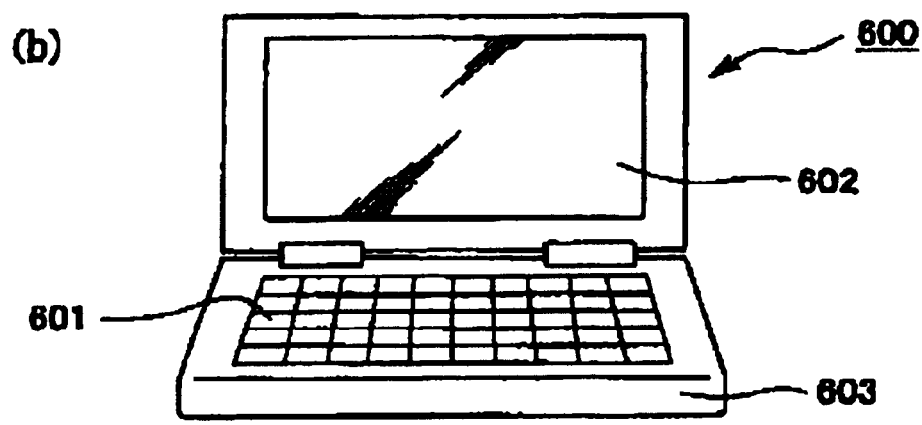
(b)
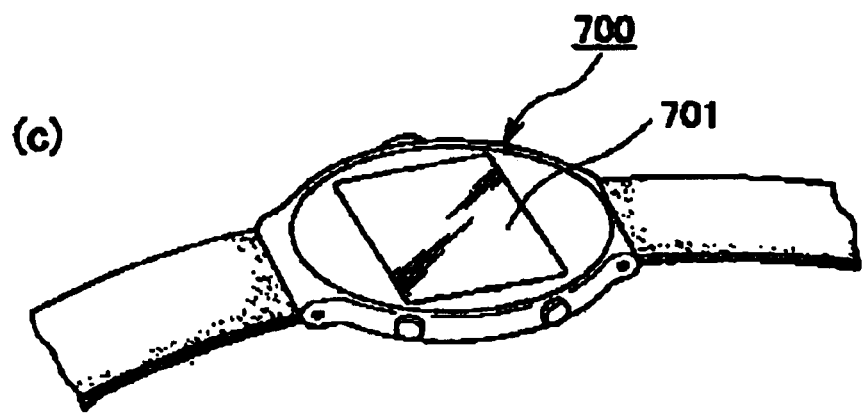
(c)

REFLECTIVE DISPLAY DEVICE AND ELECTRONIC DEVICE

BACKGROUND OF THE INVENTION

1. Field of Invention

The present invention relates to a quick-response reflective display device that has increased display brightness and contrast and that achieves high display quality. The invention also relates to an electronic device having the reflective display device.

2. Description of Related Art

Direct-view display devices can be provided in electronic devices, such as cellular phone and portable information processing devices. Reflective display devices are an example of such devices in which external light, such as sunlight, enters the display device from the viewer side, is reflected inside the display device, and is emitted toward the viewer so as to perform display. A reflective liquid crystal display device is one example of such a reflective display device in which a reflective layer is formed on the surface of one of a pair of substrates, which are placed opposed to each other so as to sandwich a liquid crystal layer, opposite from the light incident side.

In related art reflective liquid crystal display devices, however, since approximately 55% of the light that enters a reflective liquid crystal display device is absorbed by a polarizer disposed on the viewer side of a liquid crystal panel, the display brightness and contrast are lower than those in a transmissive liquid crystal display device that has a backlight therein and performs display with light emitted from the backlight. Moreover, since light transmittance/non-transmittance through the polarizer is controlled by using birefringence of the liquid crystal in the related art reflective liquid crystal display devices, color light, for example, blue light, is emitted toward the viewer when a black display is produced, and thus a pure black display sometimes cannot be produced.

In the liquid crystal display device, display is performed while changing the orientation of liquid crystal molecules in the liquid crystal layer by the application of a voltage to the liquid crystal layer, and therefore the response speed is limited. Accordingly, a digital micromirror device (DMD) has been proposed as a display device that achieves a higher response speed than in the liquid crystal display device (for example, in Japanese Unexamined Patent Application Publications Nos. 5-150173, 5-196881, 5-203888). The digital micromirror device generally includes multiple digital micromirrors disposed on a substrate. A "digital micromirror" refers to a mirror whose angle with respect to the substrate is variable.

The digital micromirror device having such a configuration can perform display by being irradiated with light from a specific direction, can produce a white (bright) display by controlling the angle formed between the digital micromirror and the substrate so that light reflected by the digital micromirror is emitted toward the viewer, and can produce a black (dark) display by controlling the angle between the digital micromirror and the substrate so that light incident on the digital micromirror device does not enter a light-reflecting surface of the digital micromirror, or so that, even when light incident on the digital micromirror device enters the light-reflecting surface of the digital micromirror, after being reflected by the digital micromirror, it is emitted in directions other than the direction toward the viewer. In the digital micromirror device, since the display is thus performed by changing the angle between the digital micromirror and the substrate, a quick response of approximately $10^3$ to $10^4$ times the speed of the liquid crystal display device is possible.

However, when the digital micromirror device is used as a reflective display device, white (bright) display is impossible because the face of the viewer, the background, and the like are reflected in the digital micromirror. Therefore, only a digital micromirror device serving as an optical modulation device to be mounted in a projection display apparatus, such as a projector, exists in the related art, and a digital micromirror device for a direct-view display device does not yet exist in the related art.

SUMMARY OF THE INVENTION

Accordingly, the present invention addresses the above circumstances, and provides a quick-response reflective display device that has increased display brightness and contrast and that achieves high display quality, and an electronic device having the reflective display device.

The present inventor has made investigations in order to address or overcome the above problems, and then has invented the following reflective display device of the present invention.

A first reflective display device of the present invention has, on a substrate, a plurality of stages whose angle with respect to the substrate is variable, reflective elements to transmit light incident from a specific direction and reflect light having a specific wavelength that is incident from a specific direction are formed on respective surfaces, opposite from the substrate, of the stages, an optical absorber to absorb light passing through each of the reflective elements is formed on the side of the reflective element opposite from the light incident side, and the reflective elements are of a plurality of types to reflect light components having different wavelengths.

The adoption of the above configuration can provide a reflective display device that can produce a monochrome display and a color display.

While the incident direction of light that enters the direct-view reflective display device to be mounted in electronic devices, such as cellular phone and portable information processing devices, is almost fixed, since the first reflective display device of the present invention has a plurality of stages whose angle with respect to the substrate is variable, and the reflective elements are formed on the respective stages, the angle between the reflective element formed on each stage and the substrate can be changed in a plurality of steps, and the incident direction of light that enters the reflective element (incident angle of light that enters the reflective element) can be changed in a plurality of steps by changing the angle between the stage and the substrate.

In the first reflective display device of the present invention, an area with one stage (one reflective element) formed therein corresponds to one dot. Each reflective element transmits light incident from a specific direction, and reflects light having a specific wavelength incident from a specific direction.

With respect to one dot, since light having a specific wavelength incident on the reflective element is reflected by the reflective element and is emitted toward the viewer by controlling the angle between the stage and the substrate so that the light having the specific wavelength incident on the reflective element is reflected by the reflective element, a color display corresponding thereto can be produced. Similarly with respect to one dot, light incident on the reflective element passes through the reflective element and is absorbed by the optical absorber disposed on the side of the reflective element opposite from the light incident side, regardless of the wavelength, by controlling the angle between the stage and the substrate so that the light incident on the reflective element passes through the reflective element, and therefore no light is emitted toward the viewer, and a black display can be produced.

While the above description has been given with respect to one dot, monochrome display and color display can be produced by providing a plurality of types of reflective elements to reflect different color light components (light components having different wavelengths) so that one pixel is displayed with a plurality of dots in which the plurality of types of reflective elements are formed. For example, when one pixel is displayed with three dots by three types of reflective elements for reflecting red light, green light, and blue light, a white display can be produced by controlling the angle between each stage and the substrate so that light incident on the reflective elements in all the three dots is reflected by the reflective elements, a color display can be produced by controlling the angle between the stage and the substrate so that light incident on the reflective elements in one or two dots is reflected by the reflective elements, and a black display can be produced by controlling the angle between the stage and the substrate so that light incident on the reflective elements in all the dots passes through the reflective elements. Furthermore, a halftone display can be produced by changing the angle between the stage and the substrate in multiple steps, which achieves full-color display.

Since the first reflective display device of the present invention can perform display without using a polarizer to absorb light, bright (high-intensity) white display and color display can be achieved. By using a hologram element that emits reflected light in a direction different from the direction of regular reflection, the face of the viewer, the background, the illumination device, and the like are prevented or substantially prevented from being reflected. Since a color display is produced by reflecting light having a specific wavelength at the reflective element, a vivid color display having high chromatic purity can be obtained compared with a case in which a color display is produced by forming a pigment dispersion type coloring layer or the like that chiefly transmits light having a specific wavelength and absorbs the other light.

While performing black display, light incident on the reflective element passes through the reflective element, and is absorbed by the optical absorber disposed on the side of the reflective element opposite from the light incident side, and no light is emitted toward the viewer, so that a pure black display having low intensity can be achieved. Since the light incident on the reflective display device is not reflected by the reflective element, the face of the viewer, the background, and the like will not be reflected in the reflective element.

Since the first reflective display device of the present invention performs display by changing the angle between each stage and the substrate, a quick response of approximately 103 to 104 times the speed of a liquid crystal display device, in which display is performed by changing the orientation of liquid crystal molecules, is possible in a manner similar to that in the digital micromirror device.

Therefore, the first reflective display device of the present invention can provide a quick-response reflective display device that has increased display brightness and contrast and that achieves high display quality.

While the above first reflective display device of the present invention has a plurality of types of reflective elements so that one pixel is displayed with a plurality of dots in which the plurality of types of reflective elements are formed, the present invention is also applicable to a case in which one pixel is displayed with one dot.

A second reflective display device of the present invention has, on a substrate, a plurality of stages whose angle with respect to the substrate is variable, reflective elements to transmit light incident from a specific direction and reflect light having a specific wavelength that is incident from a specific direction are formed on respective surfaces, opposite from the substrate, of the stages, an optical absorber to absorb light passing through each of the reflective elements is formed on a side of the reflective element opposite from the light incident side, and the reflective element reflects light components having different wavelengths, depending on the incident direction of light incident thereon.

In this way, the second reflective display device of the present invention is different from the above-described first reflective display device of the present invention in that only reflective elements of the same type are provided, instead of a plurality of types of reflective elements to reflect light components having different wavelengths, and in that each reflective element reflects a plurality of light components having different wavelengths, depending on the incident direction of light incident thereon. The adoption of such a structure makes it possible to produce monochrome display and color display with one dot.

That is, when attention is directed to one dot, in a manner similar to that in the above first reflective display device of the present invention, light incident on the reflective element passes through the reflective element, and is absorbed by the optical absorber disposed on the side of the reflective element opposite from the light incident side by controlling the angle between the stage and the substrate so that the light incident on the reflective element passes through the reflective element regardless of the wavelength, and therefore since no light is emitted toward the viewer, a black display can be produced.

Since each reflective element reflects a plurality of light components having different wavelengths depending on the incident direction of light incident thereon, when attention is similarly directed to one dot, the color light to be reflected can be changed, and a color display can be produced by controlling the angle between the stage and the substrate and controlling the incident direction of the light incident on the reflective element. By reflecting all of the red light, green light, and blue light incident on the reflective element when the incident direction of light incident on the reflective element is a specific direction, white display is made possible. Furthermore, a halftone display can be produced by changing the angle between the stage and the substrate in multiple steps, and this can achieve full-color display.

In this way, the second reflective display device of the present invention can also achieve monochrome display and color display, and can provide advantages similar to those in the first reflective display device of the present invention.

That is, since the second reflective display device of the present invention can also perform display without using a polarizer to absorb light, bright (high-intensity) white display and color display are possible. By using a hologram element that emits reflected light in a direction different from the direction of regular reflection, the face of the viewer, the background, the illumination means, and the like are prevented or substantially prevented from being reflected. Since a color display is produced by reflecting light having a specific wavelength at the reflective element, a vivid color display having high chromatic purity can be obtained.

While performing black display, light incident on the reflective element passes through the reflective element, and is absorbed by the optical absorber disposed on the side of the reflective element opposite from the light incident side, and no light is emitted toward the viewer, so that a pure black display having low intensity can be achieved. Since the light incident on the reflective display device is not reflected by the reflective element, the face of the viewer, the background, and the like will not be reflected in the reflective element.

Since the second reflective display device of the present invention also performs display by changing the angle between each stage and the substrate, a quick response of approximately $10^3$ to $10^4$ times the speed of a liquid crystal display device, in which display is performed by changing the orientation of liquid crystal molecules, is possible, in a manner similar to that in the digital micromirror device.

Therefore, the second reflective display device of the present invention can also provide a quick-response reflective display device that has increased display brightness and contrast and that achieves high display quality.

In the first and second reflective display devices of the present invention, it is preferable that an illumination device (front light) be disposed on the side of the reflective elements opposite from the substrate. This is suitable because display can be performed in a dark place where the brightness of external light is insufficient. When the illumination device is disposed on the side of the reflective element opposite from the substrate, display can be performed by specifying the emitting direction of light emitted from the illumination device so that light incident on the reflective element is reflected by the reflective element for white display and color display, and light incident on the reflective element passes therethrough for black display.

In the first and second reflective display devices of the present invention, the reflective element may be, for example, a hologram element. Since a hologram element has a light-collecting function, the display brightness and contrast can be further enhanced by forming a hologram element as the reflective element.

By adopting the above first or second reflective display device of the present invention, it is possible to provide a quick-response electronic device that has increased display brightness and contrast and that achieves high display quality.

BRIEF DESCRIPTION OF THE DRAWINGS

FIGS. 3(a) and 3(b) are schematic sectional views of the reflective display device according to the embodiment of the present invention;

FIGS. 4(a) and 4(b) are schematic sectional views showing a display mechanism in the reflective display device according to the embodiment of the present invention;

FIG. 6(a) is a perspective view of an example of a cellular phone having the reflective display device of the above embodiment, FIG. 6(b) is a perspective view of an example of a portable information processing device having the reflective display device of the above embodiment, and FIG. 6(c) is a perspective view of an example of a wristwatch-type electronic device having the reflective display device of the above embodiment.

DETAILED DESCRIPTION OF PREFERRED EMBODIMENTS

An embodiment of the present invention will now be described in detail.

[Reflective Display Device]

Figure 1:
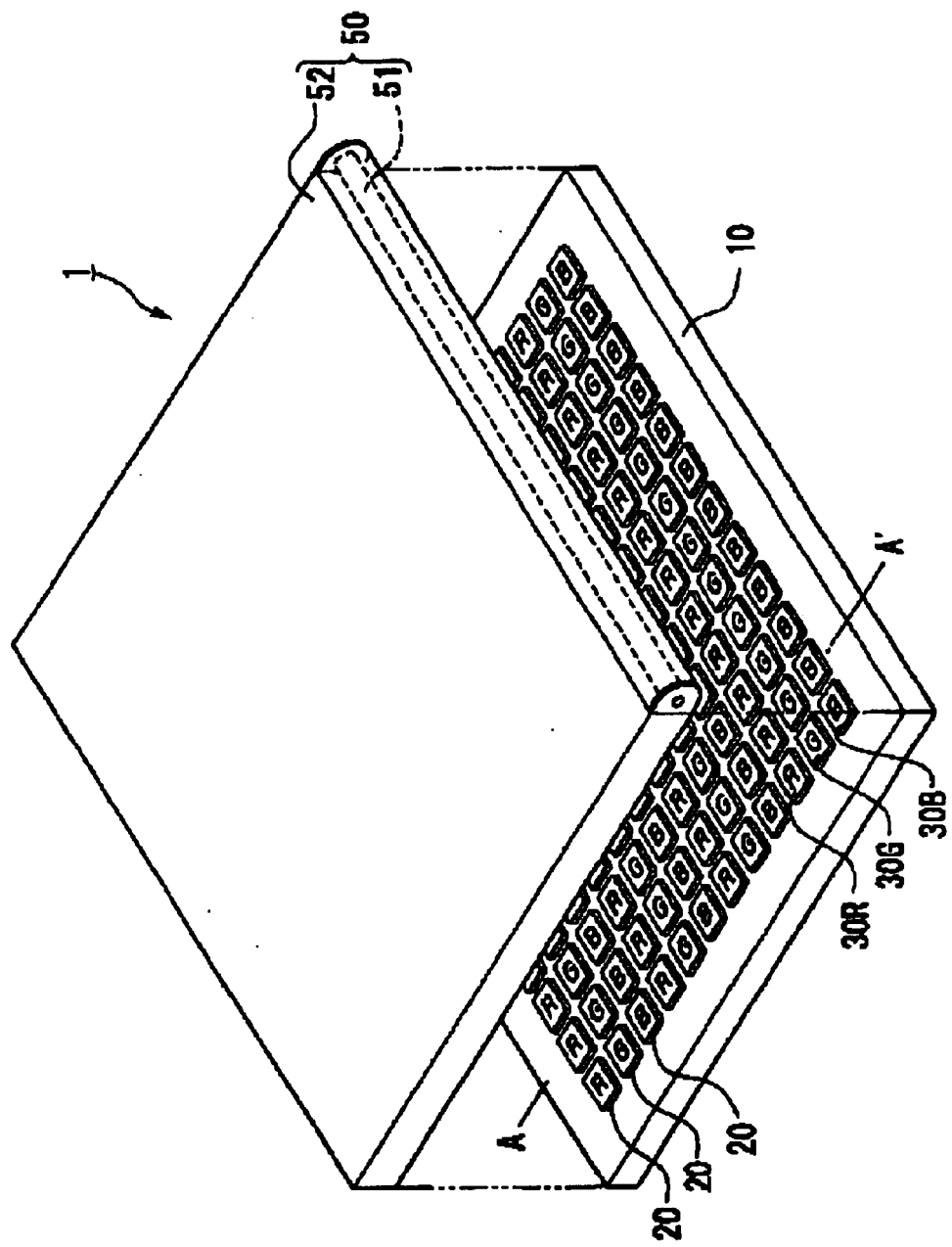
FIG. 1 is an exploded schematic perspective view of a reflective display device according to an embodiment of the present invention.
Figure 2:
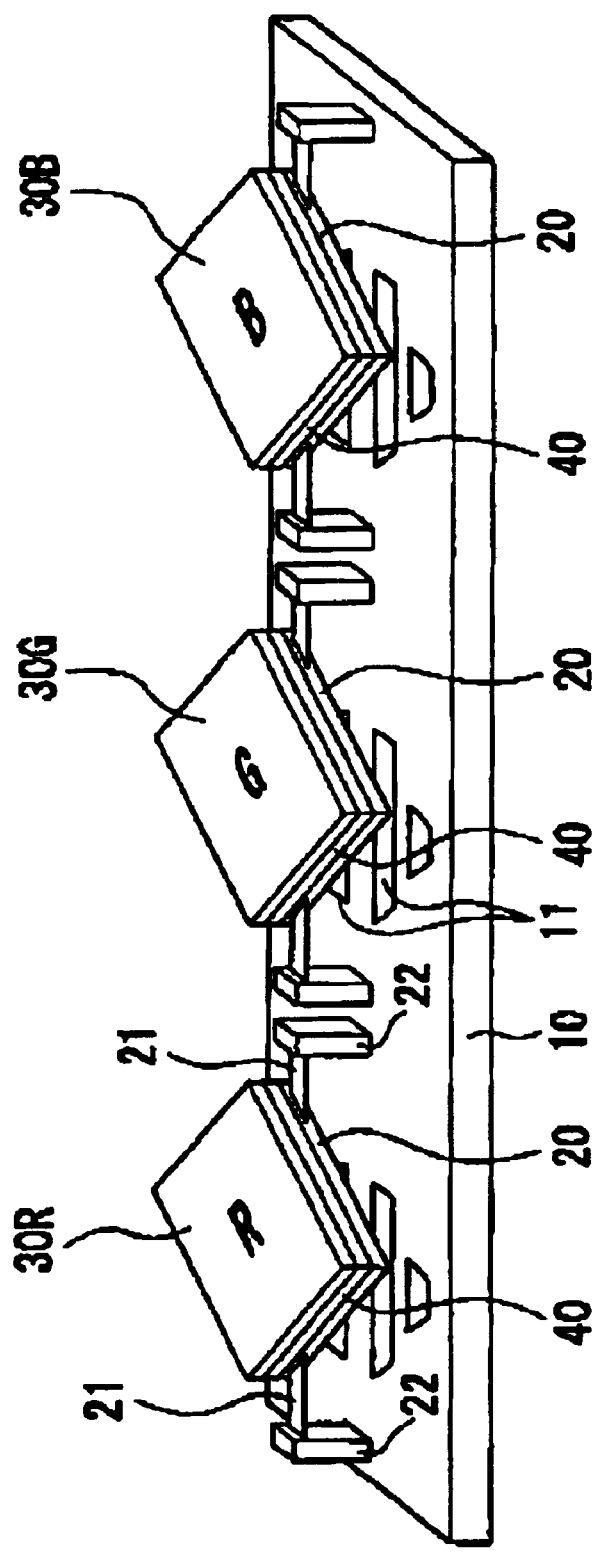
FIG. 2 is an enlarged partial perspective view showing a portion of a substrate for three dots provided in the reflective display device according to the embodiment of the present invention.

The configuration of a reflective display device, and a display mechanism according to an embodiment of the present invention, will be described with reference to FIGS. 1 to 4(b). FIG. 1 is an exploded schematic perspective view showing the overall configuration of the reflective display device of this embodiment, and FIG. 2 is an enlarged partial perspective view showing a portion of a substrate corresponding to three dots provided in the reflective display device of this embodiment. FIGS. 3(a) and 3(b) are schematic sectional views showing the overall configuration of the reflective display device of this embodiment, and FIGS. 4(a) and 4(b) are enlarged partial schematic sectional views showing a portion of the reflective display device of this embodiment corresponding to three dots in order to explain a display mechanism of the reflective display device. FIGS. 3(a)–4(b) are sectional views of the reflective display device, taken along plane A–A' in FIG. 1. In these figures, the upper side is shown as a viewer side, and the layers and the members are shown at different scales to enhance their viewability and are not drawn to scale.

(Configuration of Reflective Display Device)

As shown in FIG. 1, a reflective display device 1 of this embodiment generally includes a substrate 10 having multiple rectangular stages 20 arranged in a matrix on one surface, and a front light (illumination means) 50 disposed on the viewer side of the substrate 10. In the reflective display device 1 of this embodiment, an area in which each stage 20 is formed corresponds to one dot, and the stages 20 are formed at least in a display region.

The front light 50 generally includes a light source 51, and a light guide plate 52 to guide light emitted from the light source 51 toward the substrate 10, and the light guide plate 52 is formed so as to cover at least the display region. The front light 50, which is used as an auxiliary illumination device, is not illuminated when the intensity of external light is sufficient so that display is performed only with external light incident from the viewer side, but is illuminated so as to function as the illumination means only when the intensity of external light is insufficient.

In a case in which the reflective display device 1 of this embodiment is provided in a portable electronic device, such as a cellular phone or a portable information processing device, as shown in FIG. 3(b), the viewer generally tilts the electronic device (reflective display device 1) away from the ground and views the display from a direction substantially normal to a display surface of the electronic device so that the display surface is easily viewable. In FIG. 3(b), the direction of the normal to the display surface of the reflective display device 1 is designated H1.

While external light more specifically refers to light emitted from a lighting fixture placed on the ceiling or the like indoors, and sunlight and light emitted from a street light or the like outdoors, such external light enters the display surface of the reflective display device 1 from a position higher than the viewer. Therefore, the incident direction L1 of external light incident on the reflective display device 1 is substantially vertical relative to the ground, and is shifted by an angle θ from the direction H1 of the normal to the display surface. When the reflective display device mounted in the portable electronic device is viewed, the angle θ is, in general, almost determined within the range of 10° to 30°, for example, depending on the size of the electronic device.

In this embodiment, as shown in FIG. 3(a), the incident direction L2 of light incident from the front light 50 on the substrate 10 is set so that it substantially coincides with the incident direction L1 of external light when the front light 50 is illuminated. That is, the incident direction L2 of the light incident from the front light 50 on the substrate 10 is set to be shifted by the angle θ (10° to 30°) from the direction H1 of the normal to the display surface of the reflective display device 1. The incident direction of the light incident from the front light 50 on the substrate 10 can be controlled, for example, by devising the shape of the light guide plate 52 in the front light 50.

In this way, in the reflective display device 1 of this embodiment, light enters the substrate 10 from the direction shifted by the angle θ (10° to 30°) from the direction H1 of the normal to the substrate 10 both when external light is used and when light emitted from the front light 50 is used.

As shown in FIG. 1, any of the hologram elements (reflective elements) 30R, 30G, and 30B is formed on a surface of each stage 20 opposite from the substrate 10 in the reflective display device 1. The hologram elements 30R to 30B are elements to transmit light incident from a specific direction and reflecting light having a specific wavelength incident from a specific direction, and the hologram elements 30R to 30B are periodically arranged in a predetermined pattern.

The hologram elements 30R, 30G, and 30B are only different in the wavelength of light that they reflect, and reflect red light, green light, and blue light, respectively. Although this will be described in detail below, dots in which the hologram elements 30R, 30G, and 30B are formed can display red (R), green (G), and blue (B), and every three dots with the hologram elements 30R, 30G, and 30B can produce a display for one pixel. The pattern of the hologram elements 30R to 30B is not limited to that shown in the figure.

As is enlarged in FIG. 2, optical absorbers 40 are formed on the stages 20 on the sides of the hologram elements 30R to 30B opposite from the light-incident sides.

A pair of prismatic supporting members 22 project on the substrate 10 corresponding to each stage 20, and the pair of supporting members 22 and the stage 20 are connected by hinges 21. The hinges 21 are members that can be twisted about its extending direction, and the supporting members 22 and the hinges 21 are disposed so that the hinges 21 are placed on the diagonal line of the stage 20.

A pair of electrodes 11 are formed on the substrate 10 corresponding to each stage 20. When the substrate 10 is viewed from the light incident side, one of the electrodes 11 is placed in front of a line linking the hinges 21, and the other electrode 11 is placed behind the line linking the hinges 21. By applying different voltages to the electrodes 11 so that different electrostatic forces are generated in front of and behind the line linking the hinges 21 in the stage 20, the stage 20 can be tilted with one side (one of the sides in front of and behind the line linking the hinges 21) of the stage 20 attracted to the electrode 11.

In this way, each stage 20 can tilt about its diagonal line in the reflective display device 1 of this embodiment, and the angle formed between the stage 20 and the substrate 10 can be changed in a plurality of steps by appropriately determining the voltages to be applied to the electrodes 11.

While light enters the substrate 10 from the direction shifted by the angle θ (10° to 30°) from the direction H1 of the normal to the substrate 10 both when external light is used and when light emitted from the front light 50 is used in the reflective display device 1 of this embodiment, as described above, since the angle between each stage 20 and the substrate 10 can be changed in a plurality of steps, the incident direction of light incident on each of the hologram elements 30R to 30B (the incident angle of light incident on the hologram elements 30R to 30B) can also be changed in a plurality of steps. Display can be performed by utilizing the changes.

The reflective display device 1 of this embodiment has the above configuration, and this embodiment can provide the reflective display device 1 that can produce monochrome display and color display.

(Display Mechanism of Reflective Display Device)

Next, a display mechanism of the reflective display device 1 of this embodiment will now be described with reference to FIGS. 4(a) and 4(b). In FIGS. 4(a) and 4(b), the front light 50, the supporting members 22, and the hinges 22 are not shown. The angle formed between the stage 20 and the substrate 10 is positive when shifted from the surface of the substrate 10 in the counterclockwise direction in FIGS. 4(a) and 4(b), and is negative when shifted in the clockwise direction. In the following description, for example, display is performed while controlling the angle between the stage 20 and the substrate 10 in two steps, 0° and a (0°<α). The incident angle of light incident on the hologram elements 30R to 30B (the angle formed between the direction of the normal to the hologram elements 30R to 30B and the light incident direction) is positive when shifted from the direction of the normal to the hologram elements 30R to 30B in the counterclockwise direction in FIGS. 4(a) and 4(b), and is negative when shifted in the clockwise direction.

While the stage 20 is actually tilted about its diagonal line, as described above, it is, in the following description, tilted about the center line between two opposing sides thereof in order to simplify the description. When the stage 20 is tilted about the center line between the two opposing sides, the display mechanism is just the same as that when the stage 20 is tilted about the diagonal line.

In the reflective display device 1 of this embodiment, since light enters from the direction shifted by the angle θ (10° to 30°) from the direction H1 of the normal to the substrate 10 both when external light is used and when light emitted from the front light 50 is used, as described above, light incident on the reflective display device 1, including the external light and the light emitted from the front light 50, is designated L in FIGS. 4(a) and 4(b).

As shown in FIG. 4(a), when the angle formed between the stage 20 and the substrate 10 is 0°, since the stage 20 and the substrate 10 are in parallel with each other, the direction H1 of the normal to the substrate 10 and the direction H2 of the normal to the hologram elements 30R to 30B are the same, and the incident angle of light incident on the hologram elements 30R to 30B is θ.

When the hologram elements 30R to 30B are set to reflect light having a specific wavelength that enters from the direction shifted by the angle θ from the direction H2 of the normal thereto, they can reflect red light $L_R$, green light $L_G$, and blue light $L_B$, respectively. Since each reflected color light is emitted toward the viewer, each dot can display an individual color. It is preferable that the light reflecting direction of the hologram elements 30R to 30B be set so that the colored light reflected by the hologram elements 30R to 30B is emitted in the viewing direction of the viewer (that is, the direction substantially normal to the substrate 10), as shown in FIG. 4(a). The adoption of such a configuration makes it possible to increase the amount of light to be viewed by the viewer, and to produce a bright display.

In contrast, when the angle formed between the stage 20 and the substrate 10 is α, as shown in FIG. 4(b), the incident angle of light that is incident on the hologram elements 30R to 30B is θ-α. When the hologram elements 30R to 30B are set to transmit light that is incident from the direction shifted by the angle θ-α from the direction H2 of the normal thereto, the light incident on the hologram elements 30R to 30B passes therethrough regardless of the wavelength, and therefore is absorbed by the optical absorbers 40 placed just under the hologram elements 30R to 30B. No light is emitted toward the viewer, and a black display can be produced.

While the angle formed between the stage 20 and the substrate 10 is equal among the three dots with the hologram elements 30R to 30B in FIGS. 4(a) and 4(b), as described above, monochrome display and color display can be performed by changing the angle between the stage 20 and the substrate 10 to 0° or α dot-by-dot so that every three dots with the hologram elements 30R to 30B display one pixel.

That is, since all the color light components, that is, red light, green light, and blue light, are emitted toward the viewer by setting the angle between the stage 20 and the substrate 10 to 0° in all three dots, as shown in FIG. 4(a), a white display can be produced.

Since no color is emitted toward the viewer by setting the angles formed between the stages 20 and the substrates 10 to α in all three dots, as shown in FIG. 4(b), a black display can be produced.

Furthermore, a color display can be produced by setting the angle between the stage 20 and the substrate 10 to 0° in one or two of the three dots, and setting the angle between the stage 20 and the substrate 10 to α in the remaining dot(s). More specifically, a red (green, blue) display can be produced by setting the angle between the stage 20 and the substrate 10 to 0° in a dot having the hologram element 30R (30G, 30B) of the three dots, and setting the angle between the stage 20 and the substrate 10 to α in the other dots. A display of a mixture of two of the red, green, and blue colors can be produced by setting the angle between the stage 20 and the substrate 10 to 0° in two of the three dots, and setting the angle between the stage 20 and the substrate 10 to α in the other dot.

Moreover, in this embodiment, it is preferable that the angle between the stage 20 and the substrate 10 be changed in multiple steps between 0° and α, and the adoption of such a setting permits halftone display, and achieves full-color display.

While light having a specific wavelength that enters the hologram elements 30R to 30B is reflected by the hologram elements 30R to 30B when the angle between the stage 20 and the substrate 10 is 0°, and light that enters the hologram elements 30R to 30B passes through the hologram elements 30R to 30B when the angle between the stage 20 and the substrate 10 is α in this embodiment, a setting exactly contrary thereto can produce a similar display.

That is, even when light that enters the hologram elements 30R to 30B passes through the hologram elements 30R to 30B when the angle between the stage 20 and the substrate 10 is 0°, and light having a specific wavelength that enters the hologram elements 30R to 30B is reflected by the hologram elements 30R to 30B when the angle between the stage 20 and the substrate 10 is α, the same display can be performed except that white display and black display are reversed.

Since the reflective display device 1 of this embodiment can perform display in the above-described manner, and can perform display without using a polarizer to absorb light, bright (high-intensity) white display and color display can be achieved. By using the hologram elements 30R to 30B that emit reflected light in a direction different from the direction of regular reflection, the face of the viewer, the background, the illumination device, and the like are prevented or substantially prevented from being reflected. Since a color display is produced by reflecting light having a specific wavelength by the hologram elements 30R to 30B, a vivid color display having high chromatic purity can be obtained, compared with a case in which a color display is produced by forming a pigment dispersion type coloring layer or the like that chiefly transmits light having a specific wavelength and absorbs the other light.

While performing black display, light incident on the hologram elements 30R to 30B passes therethrough, and is absorbed by the optical absorbers 40 disposed on the sides of the hologram elements 30R to 30B opposite from the light incident sides, and no light is emitted toward the viewer, so that a pure black display having low intensity can be achieved. Since the light incident on the reflective display device 1 is not reflected by the hologram elements 30R to 30B, the face of the viewer, the background, and the like will not be reflected in the hologram elements 30R to 30B.

Since the reflective display device 1 of this embodiment performs display by changing the angle between the stage 20 and the substrate 10, a quick response of approximately $10^3$ to $10^4$ times the speed of a liquid crystal display device, in which display is performed by changing the orientation of liquid crystal molecules, is possible in a manner similar to that in the digital micromirror device.

Therefore, this embodiment can provide a quick-response reflective display device 1 that has increased display brightness and contrast and that achieves high display quality.

While display is performed in this embodiment by changing the angle between each stage 20 and the substrate 10 between 0° and α, the present invention is not limited thereto. Since the angle between the stage 20 and the substrate 10 can be set within a wide range, the relationship between the angle between the stage 20 and the substrate 10, and the display can be designed appropriately. Since the angle with respect to the substrate 10 can be controlled in every stage 20, it is possible to set the incident direction of light to be reflected by the hologram elements 30R to 30B and the incident direction of light to pass through the hologram elements 30R to 30B dot-by-dot.

While, in this embodiment, a pair of supporting members 22 are formed on the substrate 10 on the diagonal line of each stage 20, the supporting members 22 and the stage 20 are connected by the hinges 21, and a pair of electrodes 11 are formed on the substrate 10 so that the stage 20 can be tilted about the diagonal line, the present invention is not limited to such a structure, and may adopt any structure that allows the stage 20 to be tilted in a predetermined direction.

While the optical absorbers 24 are formed on the stages 20 and just under the hologram elements 30R to 30B in this embodiment, the present invention is not limited thereto, and the optical absorbers 24 may be formed at any positions that are opposite from the light incident sides of the hologram elements 30R to 30B. For example, the optical absorbers 24 may be formed over the entire surface of the substrate 10 on the light incident side, or over the entire surface of the substrate 10 opposite from the light incident side.

In such a structure, light passing through the hologram elements 30R to 30B may be reflected by interfaces between the hologram elements 30R to 30B and the stages 20, or the like and may return to the viewer side without being absorbed by the optical absorbers 40 during black display, and this may increase the brightness of the black display. Therefore, when such a risk exists, it is preferable that the optical absorbers 40 be formed just under the hologram elements 30R to 30B, as in this embodiment.

While the front light 50 is disposed on the Light incident side of the substrate 10 in this embodiment, the present invention is not limited thereto. Display may be performed only with external light without using the front light 50.

A case in which the front light 50 is used, as in this embodiment, is suitable because the display can be viewed even in a dark place. Although the power consumption when the front light 50 is used is higher than that when the front light 50 is not used, since the front light 50 is illuminated only when the intensity of external light is insufficient, and display is only performed with external light in other cases, the power consumption is far lower than in a transmissive display device in which a backlight needs to be continuously illuminated.

While the hologram elements 30R to 30B are formed as reflective elements on the stages 20 in this embodiment, the present invention is not limited thereto, and reflective elements having any structure may be formed as long as they have the functions of transmitting light incident from a specific direction and reflecting light having a specific wavelength incident from the specific direction. Reflective elements other than the hologram elements 30R to 30B described in this embodiment are, for example, reflective elements made of cholesteric liquid crystal having selective reflectivity. Since the hologram elements have a light-collecting function, the use of the hologram elements 30R to 30B as reflective elements, as in this embodiment, is suitable because they can further increase the display brightness and contrast.

While the reflective display device can display one pixel by three dots in the above-described embodiment, the present invention is also applicable to a case in which one pixel is displayed by one dot.

The configuration of a reflective display device of the present invention that can display one pixel by one dot is described briefly below. While a case in which one pixel is displayed by one dot adopts a basic configuration similar to that in the above embodiment, it greatly differs from the above embodiment, in which three types of hologram elements (reflective elements) 30R to 30B to reflect red light, green light, and blue light, respectively, are formed, in that one type of hologram element 30 is provided. Accordingly, a display mechanism in a case in which one pixel is displayed by one dot will be described below with reference to FIGS. 5(a)–5(e), in which only a stage 20, a hologram element 30, and an optical absorber 40 for one dot are shown. The description will be given on the assumption that the stage 20 is tilted about the center line between two opposing sides thereof in order to simplify the description, in a manner similar to that in the above embodiment.

One pixel can be displayed by one dot by setting each hologram element 30 so that it reflects a plurality of light components having different wavelengths, depending on the incident direction of the light incident thereon.

Figure 5:
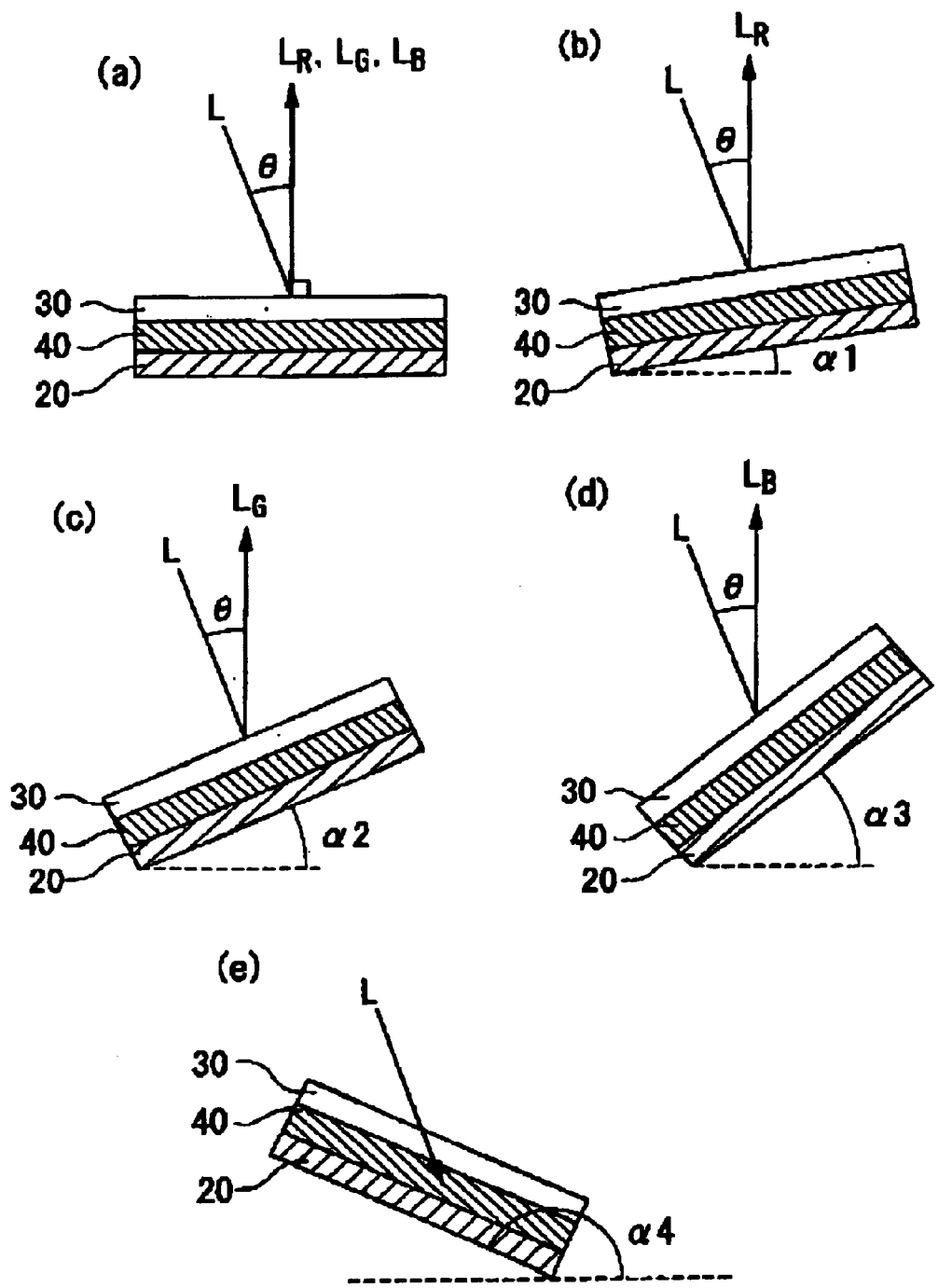
FIGS. 5(a) to 5(e) are schematic sectional views showing a display mechanism in a reflective display device of the present invention in which one pixel is displayed by one dot.

For example, when the angle between the stage 20 and the substrate 10 is 0°, as shown in FIG. 5(a), the incident angle of light incident on the hologram element 30 is θ, as described in the above embodiment. By causing the hologram element 30 to reflect all the red light $L_R$, green light $L_G$, and blue light $L_B$ incident from the directions shifted by the angle θ from the direction of the normal to the hologram elements 30R to 30B, the red light $L_R$, the green light $L_G$, and the blue light $L_B$ are emitted toward the viewer, and therefore, a white display can be produced.

When the angle between the stage 20 and the substrate 10 is α1 (0°<α1), as shown in FIG. 5(b), the incident angle of light incident on the hologram element 30 is θ-α1, as described in the above embodiment. By causing the hologram element 30 to reflect only red light $L_R$ incident from the direction shifted by the angle θ-α1 from the direction of the normal to the hologram elements 30R to 30B, only the red light $L_R$ is emitted toward the viewer, and therefore, a red display can be produced.

Similarly, when the angle between the stage 20 and the substrate 10 is α2 (α1<α2), as shown in FIG. 5(c), the incident angle of light incident on the hologram element 30 is θ-α2. By causing the hologram element 30 to reflect only green light $L_G$ incident from the direction shifted by the angle θ-α2 from the direction of the normal to the hologram elements 30R to 30B, only the green light $L_G$ is emitted toward the viewer, and therefore a green display can be produced.

Similarly, when the angle between the stage 20 and the substrate 10 is α3 (α2<α3), as shown in FIG. 5(d), the incident angle of light incident on the hologram element 30 is θ-α3. By causing the hologram element 30 to reflect only blue light $L_B$ incident from the direction shifted by the angle θ-α3 from the direction of the normal to the hologram elements 30R to 30B, only the blue light $L_B$ is emitted toward the viewer, and therefore a blue display can be produced.

When the angle between the stage 20 and the substrate 10 is α4 (α3<α4), as shown in FIG. 5(e), by transmitting all the light incident from the direction shifted by the angle θ-α3 from the direction of the normal to the hologram elements 30R to 30B, no light is emitted toward the viewer, and therefore a black display can be produced.

When the angle between the stage 20 and the substrate 10 is a specific angle between α1 and α2, a mixed color of red and green can be displayed by causing the hologram element 30 to reflect both the red light $L_R$ and the green light $L_G$. Similarly, a mixed color of red and blue, and a mixed color of green and blue can be displayed. Furthermore, a neutral color can be displayed by controlling the angle between the stage 20 and the substrate 10 in a similar manner, and full-color display is possible.

The angles between the stage 20 and the substrate 10 to display the colors are not limited to the above examples, and may be designed appropriately.

Since each hologram element 30 reflects a plurality of light components having different wavelengths depending on the incident direction of light incident thereon, as described above, one pixel can be displayed by one dot, and this can provide a quick-response reflective display device that has increased display brightness and contrast and that achieves high display quality, in a manner similar to that in the above embodiment.

Since one pixel can be displayed by one dot in such a configuration, higher definition than in the above embodiment is possible. However, it is necessary to control the angle between the stage 20 and the substrate 10 in steps corresponding to the number of colors to be displayed.

For example, while the angle between the stage 20 and the substrate 10 only needs to be controlled in two steps of 0° and α in the above embodiment in order to display only five colors, red, green, blue, white, and black, it needs to be controlled in five steps of 0° and α1 to α4 when one pixel is displayed by one dot, as described with reference to FIGS. 5(a)–5(e). In this way, when one pixel is displayed by one dot, the angle between the stage 20 and the substrate 10 needs to be controlled in more steps than in the case where one pixel is displayed by three dots, and therefore the design of such a reflective display device becomes difficult.

[Electronic Devices]

Next, descriptions will be provided of specific examples of electronic devices having the reflective display device 1 according to the above embodiment of the present invention.

FIG. 6(a) is a perspective view showing an example of a cellular phone. In FIG. 6(a), reference numerals 500 and 501 denote a body of the cellular phone, and a display section having the above-described reflective display device 1, respectively.

FIG. 6(b) is a perspective view showing an example of a portable information processing device, such as a word processor or a personal computer. In FIG. 6(b), reference numerals 600, 601, 603, and 602 denote an information processing device, an input section such as a keyboard, an information processing body, and a display section having the above-described reflective display device 1, respectively.

FIG. 6(c) is a perspective view showing an example of a wristwatch type electronic device. In FIG. 6(c), reference numerals 700 and 701 denote a watch body, and a display section having the above-described reflective display device 1, respectively.

Since the electronic devices shown in FIGS. 6(a) to 6(c) have the reflective display device of the above embodiment, they have increased display brightness and contrast, achieve high display quality, and effect quick response.

[Advantages]

As described in detail above, in the present invention, a plurality of stages are formed on the substrate so that the angle thereof with respect to the substrate is variable, the reflective elements to transmit light incident from a specific direction and reflect light having a specific wavelength that is incident from a specific direction are formed on respective surfaces, opposite from the substrate, of the stages, and the optical absorber to absorb light passing through each of the reflective elements is formed on a side of the reflective element opposite from the light incident side. This makes it possible to provide a quick-response reflective display device that has increased display brightness and contrast and that achieves high display quality.

By adopting the reflective display device of the present invention, it is possible to provide a quick-response electronic device that has increased display brightness and contrast and that achieves high display quality.

What is claimed is:

1. A reflective display device, comprising:

a substrate;

a plurality of stages disposed on the substrate, each stage having a surface and being movable to change an angle of the surface with respect to said substrate;

reflective elements, to transmit light incident from a specific direction and reflect light having a specific wavelength that is incident from a specific direction, formed on respective surfaces, opposite from said substrate, of said stages, said reflective elements being of a plurality of types to reflect light components having different wavelengths; and an optical absorber, to absorb light passing through each of said reflective elements, formed on a side of said reflective element opposite from a light incident side.

2. A reflective display device, comprising:

a substrate;

a plurality of stages disposed on the substrate, each stage having a surface and being movable to change an angle of the surface with respect to said substrate;

reflective elements, to transmit light incident from a specific direction and reflect light having a specific wavelength that is incident from a specific direction, formed on respective surfaces, opposite from said substrate, of said stages, said reflective elements reflecting light components having different wavelengths, depending on the incident direction of light incident thereon; and an optical absorber, to absorb light passing through each of said reflective elements formed on a side of said reflective element opposite from a light incident side.

3. The reflective display device according to claim 1, further including an illumination device to emit light in a specific direction is disposed on the side of said reflective elements opposite from said substrate.

4. The reflective display device according to claim 1, said reflective element being a hologram element.

5. An electronic device, comprising:

the reflective display device according to claim 1.

6. The reflective display device according to claim 2, further including an illumination device to emit light in a specific direction is disposed on the side of said reflective elements opposite from said substrate.

7. The reflective display device according to claim 2, said reflective element being a hologram element.

8. The reflective display device according to claim 3, said reflective element being a hologram element.

9. An electronic device, comprising:

the reflective display device according to claim 2.

10. An electronic device, comprising:

the reflective display device according to claim 3.

11. An electronic device, comprising:

the reflective display device according to claim 4.

* * * * *